UNITED STATES PATENT OFFICE.

ORAZIO LUGO, OF NEW YORK, N. Y.

VULCANITE AND PROCESS OF PRODUCING THE SAME.

SPECIFICATION forming part of Letters Patent No. 343,591, dated June 15, 1886.

Application filed November 5, 1885. Serial No. 181,915. (Specimens.)

*To all whom it may concern:*

Be it known that I, ORAZIO LUGO, a citizen of the United States, residing in the city, county, and State of New York, have invented a certain new and useful Improvement in Vulcanites and Process of Producing the Same; and I do hereby declare the following to be a specification.

The object of my invention is to produce a vulcanite, or substance resembling vulcanite, celluloid, or the like, by combining with india-rubber or other vulcanizable substance and sulphur, nitrogenous substances readily available and not heretofore employed in connection therewith, and thus to supply a substance to take the place of vulcanite, &c., in the arts, which, while possessed of all the requisite qualities and properties of vulcanite, &c., shall be comparatively inexpensive.

My invention consists in a process of producing a vulcanite, or a substance resembling vulcanite or the like, and in a vulcanite or substance having the property thereof, the process consisting in subjecting a mixture of appropriate nitrogenous substances with india-rubber or other vulcanizable substances and sulphur to heat and pressure in a suitable manner, and the product consisting, generally, in the compound form of the materials named.

I have discovered that if a mixture of india-rubber or other vulcanizable substance and sulphur with hair, or with ground or disintegrated horn, hoof, or analogous substance, be subjected to heat and pressure in a vessel a perfect vulcanite, or composition resembling the same and having its properties and qualities, can be produced with even a small amount of rubber, thus effecting a great saving.

In order to enable those skilled in the art to practice my invention, I will now describe my procedure, as well as some of the various mixtures which may be employed.

I take hair or disintegrated horn, hoof, or analogous substance, freed from extraneous matter, particularly from fatty matter, in any suitable and convenient manner, mix this with a suitable quantity of sulphur and rubber, and subject the whole to a slight heat say—about 200° Fahrenheit—in a vessel or mold under pressure, preferably that of a hydraulic press. More nitrogenous substance, india-rubber, and sulphur may from time to time be supplied to the vessel or mold, in order to fill the same, increase the quantity, or attain the requisite pressure, and, the treatment continuing for a few minutes, a compact mass is formed, which is then subjected to a higher temperature, in order to vulcanize the mass. I then increase the heat to about 300° Fahrenheit, and continue the same from one to three hours, according to the degree of hardness it is desired to impart to the product, increased pressure in connection with heat also contributing to increase of hardness.

Referring to the proportions to be employed, I may say that I have obtained good results with a mixture of seventy parts of dry horn, six parts of india-rubber, and twenty-four parts of sulphur, having kept the mixture under a heat of about 300° Fahrenheit, a pressure sufficient to hold the mass compact, and for about two hours. I have also obtained a good vulcanite with a mixture of fifteen parts of india-rubber, sixty-one parts of powdered horn, and twenty-four parts of sulphur, heating the mixture under pressure for two hours. Hair or hoof gave the same results as horn.

It is unnecessary more particularly to describe the requisite heat and pressure to be employed, since these are well known in the art of vulcanizing.

The kind and appearance of the product may be varied according to the quantity of india-rubber or sulphur and the degree of heat and pressure employed, while the appearance may further be changed by incorporation of suitable colors or metals.

When it is desired positively to color my vulcanites or to make them of differing appearance before vulcanization, I then incorporate a suitable mineral color or metal in comminuted form, or I inlay the surface of the mass in variegated form or artistic design, with suitable metal or other heat-resistaing substance. I can thus produce vulcanites of different colors or a vulcanite of variety of color or appearance in itself. For inlaying I may employ any suitable metal—such as platinum, gold, copper, steel, or the like.

The new product of my invention can be worked in any manner, and turned or polished—as horn, hard rubber, or common vulcanite or celluloid are now treated—and can be applied to all uses in the arts in which they are employed.

Having thus described my invention, what I claim, and desire to secure by Letters Patent, is—

1. The process of producing the within-described vulcanites, which consists in submitting a mixture of hair with india-rubber or other vulcanizable substance and sulphur, or of horny material with india rubber or other vulcanizable substance and sulphur, to heat and pressure, substantially as described.

2. A compound of hair or horny material with sulphur and india-rubber or its equivalent, substantially as and for the purpose set forth.

3. A vulcanite composed of hair or horny material, sulphur, and india-rubber or its equivalent, and colored, substantially as described.

4. A vulcanite composed of hair or horny material, sulphur, and india-rubber or its equivalent, and inlaid, substantially as described.

ORAZIO LUGO.

Witnesses:
JAMES THOMSON,
ALLEN L. PURVES.